(12) United States Patent
Koga et al.

(10) Patent No.: US 11,856,977 B2
(45) Date of Patent: Jan. 2, 2024

(54) MIXING APPARATUS FOR MIXING AN ADDITIVE WITH FOOD WHILE THE FOOD IS FALLING

(71) Applicants: MAYEKAWA MFG. CO., LTD., Tokyo (JP); AJINOMOTO CO., INC., Tokyo (JP)

(72) Inventors: Shigeto Koga, Tokyo (JP); Hiroshi Fujita, Tokyo (JP); Yoshihiro Uchida, Tokyo (JP); Kazuhiro Toyota, Saitama (JP); Takahiro Kawasoe, Sanuki (JP)

(73) Assignees: MAYEKAWA MFG. CO., LTD., Tokyo (JP); AJINOMOTO. CO., INC., Tokyo (JP)

( * ) Notice: Subject to any disclaimer, the term of this patent is extended or adjusted under 35 U.S.C. 154(b) by 920 days.

(21) Appl. No.: 16/738,039

(22) Filed: Jan. 9, 2020

(65) Prior Publication Data
US 2020/0297022 A1 Sep. 24, 2020

(30) Foreign Application Priority Data
Mar. 20, 2019 (JP) .................. 2019-053538

(51) Int. Cl.
*A47J 31/40* (2006.01)
*A47J 31/54* (2006.01)
(Continued)

(52) U.S. Cl.
CPC ............ *A23P 20/18* (2016.08); *A23G 3/0095* (2013.01); *A23G 3/26* (2013.01); *A23L 7/109* (2016.08);
(Continued)

(58) Field of Classification Search
CPC .......... A23L 7/109; A23P 20/18; A23P 20/13; B01F 25/721; A23G 3/26; A23G 3/0095;
(Continued)

(56) References Cited

U.S. PATENT DOCUMENTS 2,324,874 A * 7/1943 Peters ..................... A23L 7/101
118/58
3,319,941 A * 5/1967 Isaacs, Jr. ............... B01F 27/60
366/45
(Continued)

FOREIGN PATENT DOCUMENTS

| JP | H01-235534 A | 9/1989 |
|---|---|---|
| JP | H10-052366 A | 2/1998 |

(Continued)

OTHER PUBLICATIONS

Office Action (Notice of Reasons for Refusal) dated Feb. 7, 2023, by the Japan Patent Office in corresponding Japanese Patent Application No. 2019-053538 and an English translation of the Office Action. (8 pages).

*Primary Examiner* — Karl Kurple
(74) *Attorney, Agent, or Firm* — BUCHANAN INGERSOLL & ROONEY PC

(57) ABSTRACT

A mixing apparatus is configured to efficiently input noodles coated with an additive to a receiving tray, with no need to perform weighing again after the noodles are input to the receiving tray. The mixing apparatus includes at least two hoppers that each house falling noodles and that allows the noodles to fall through rotation of the hoppers. A supply
(Continued)

device supplies a sauce to the noodles in the hoppers, and the two hoppers are spaced from one another in the falling direction.

21 Claims, 7 Drawing Sheets

(51) Int. Cl.
| | |
|---|---|
| *A47J 31/46* | (2006.01) |
| *B05C 3/00* | (2006.01) |
| *A23P 20/18* | (2016.01) |
| *A23L 7/109* | (2016.01) |
| *B01F 25/721* | (2022.01) |
| *A23G 3/26* | (2006.01) |
| *A23P 20/13* | (2016.01) |
| *A61J 3/00* | (2006.01) |
| *B05B 13/02* | (2006.01) |
| *A23G 3/34* | (2006.01) |
| *B01J 2/12* | (2006.01) |
| *B01F 35/75* | (2022.01) |
| *B01F 33/81* | (2022.01) |
| *B05D 3/12* | (2006.01) |
| *B67D 1/00* | (2006.01) |
| *B05C 3/08* | (2006.01) |

(52) U.S. Cl.
CPC ............ *A23P 20/13* (2016.08); *A47J 31/401* (2013.01); *A47J 31/402* (2013.01); *A47J 31/404* (2013.01); *A47J 31/465* (2013.01); *A47J 31/54* (2013.01); *A61J 3/005* (2013.01); *B01F 25/721* (2022.01); *B01F 33/813* (2022.01); *B01F 35/7548* (2022.01); *B01J 2/12* (2013.01); *B05B 13/025* (2013.01); *B05B 13/0257* (2013.01); *A23V 2002/00* (2013.01); *B05C 3/00* (2013.01); *B05C 3/08* (2013.01); *B05D 3/12* (2013.01); *B67D 1/0016* (2013.01)

(58) Field of Classification Search
CPC .......... B01J 2/12; B05B 13/0257; B05D 3/12; B67D 1/0016; A61J 3/005; B05C 3/08; A47J 31/465; A47J 31/404; A47J 31/401; A47J 31/402; A47J 31/54
USPC ......... 99/478, 479, 450, 516–519, 531, 574, 99/629, 634, 641, 656
See application file for complete search history.

(56) References Cited

U.S. PATENT DOCUMENTS

| | | | | |
|---|---|---|---|---|
| 3,368,366 | A * | 2/1968 | Keeling | A23L 3/361 62/381 |
| 3,559,960 | A * | 2/1971 | Elder | B01F 27/60 366/187 |
| 3,938,537 | A * | 2/1976 | Kalko | B01F 33/812 426/477 |
| 4,798,614 | A * | 1/1989 | Aubry | F25D 3/11 62/381 |
| 5,119,720 | A * | 6/1992 | Rodriguez | A23L 3/14 99/371 |
| 5,363,754 | A * | 11/1994 | Coles | A23K 40/30 19/40 |
| 6,197,358 | B1 * | 3/2001 | Bunker | A23L 19/15 426/639 |
| 6,363,625 | B1 * | 4/2002 | Niemi | E01C 19/1036 432/106 |
| 6,832,545 | B2 * | 12/2004 | Satake | A23L 7/196 99/518 |
| 6,848,824 | B1 * | 2/2005 | Peters | A22C 9/004 99/519 |
| 6,994,016 | B1 * | 2/2006 | Bunker | A23L 3/01 99/348 |
| 11,148,157 | B2 * | 10/2021 | Gandolfi | B05C 11/08 |
| 2004/0043122 | A1 * | 3/2004 | Yakushigawa | A23P 20/15 366/279 |
| 2006/0127532 | A1 * | 6/2006 | Degady | A23G 3/2092 426/5 |
| 2007/0254081 | A1 * | 11/2007 | Cullen | A23L 27/00 426/534 |
| 2009/0092752 | A1 * | 4/2009 | Brandt, Jr. | A23N 12/10 118/19 |
| 2010/0080897 | A1 * | 4/2010 | Fiesser | B05D 1/02 427/212 |
| 2013/0055907 | A1 * | 3/2013 | Brandt, Jr. | A23G 4/025 99/516 |
| 2015/0276312 | A1 * | 10/2015 | Mardikian | F26B 7/00 34/61 |
| 2020/0055079 | A1 * | 2/2020 | Gandolfi | B05B 13/0257 |
| 2020/0070193 | A1 * | 3/2020 | Gandolfi | B05C 3/08 |

FOREIGN PATENT DOCUMENTS

| | | |
|---|---|---|
| JP | 2929187 B1 | 8/1999 |
| JP | 2004-016692 A | 1/2004 |
| JP | 2007275401 A | 10/2007 |
| JP | 2008-126002 A | 6/2008 |
| JP | 4529022 B2 | 8/2010 |

\* cited by examiner

MIXING APPARATUS FOR MIXING AN ADDITIVE WITH FOOD WHILE THE FOOD IS FALLING

BACKGROUND

Technical Field

The present invention relates to a mixing apparatus, and more particularly to a mixing apparatus that mixes an additive with food.

Description of Related Arts

Fried noodles sold at supermarkets or other places is an example of food that is manufactured by first boiling noodles and then coating the boiled noodles with an additive such as a sauce.

In this manufacturing process, the process of coating the boiled noodles with the additive is performed using a large cooking pot as illustrated in Japanese Unexamined Patent Publication No. 2007-275401. Specifically, the boiled and cooled noodles are input together in a cooking pot, an additive is further added, and the noodles are coated with the additive. Thereafter, an operator manually inputs the noodles, each in a desired amount, into a receiving tray and performs weighing to check whether the noodles with desired weight have been input.

In a case where the operator manually inputs food into the receiving tray as described above, the work takes effort and time because this is manually done by the operator. In addition, it is necessary to perform weighing after manually inputting the food in the receiving tray, leading to reduction of productivity.

The present invention has been made in order to solve the above problems, and aims to provide a mixing apparatus capable of efficiently inputting food coated with an additive on a receiving tray, and without weighing the food again after the food is received on the receiving tray.

SUMMARY

A mixing apparatus to achieve the above-described object is a mixing apparatus that mixes an additive with a food while the food is falling in a falling direction toward a receiving tray. The mixing apparatus includes: a hopper that houses the falling food and that rotates to allow the food to fall; and a supply part that supplies the additive to the food in the hopper. At least two hoppers are provided in a falling direction of the food.

According to the mixing apparatus configured as described above, the additive is automatically supplied to the food in the hopper, and the food falls by the rotation of the hopper. Therefore, it is possible to efficiently input the food coated with the additive into the receiving tray. Furthermore, the desired amount of food weighed in advance is coated with the additive, in the hopper, and the food falls into the receiving tray after being coated with the additive. This allows the desired amount of food to be disposed, as it is, in the receiving tray. For this reason, there is no need to weigh after the food is input into the receiving tray. As described above, it is possible to provide a mixing apparatus capable of efficiently inputting the food coated with the additive to the receiving tray, without the need for performing weighing after the food is input to the receiving tray.

DETAILED DESCRIPTION

Figure 1:
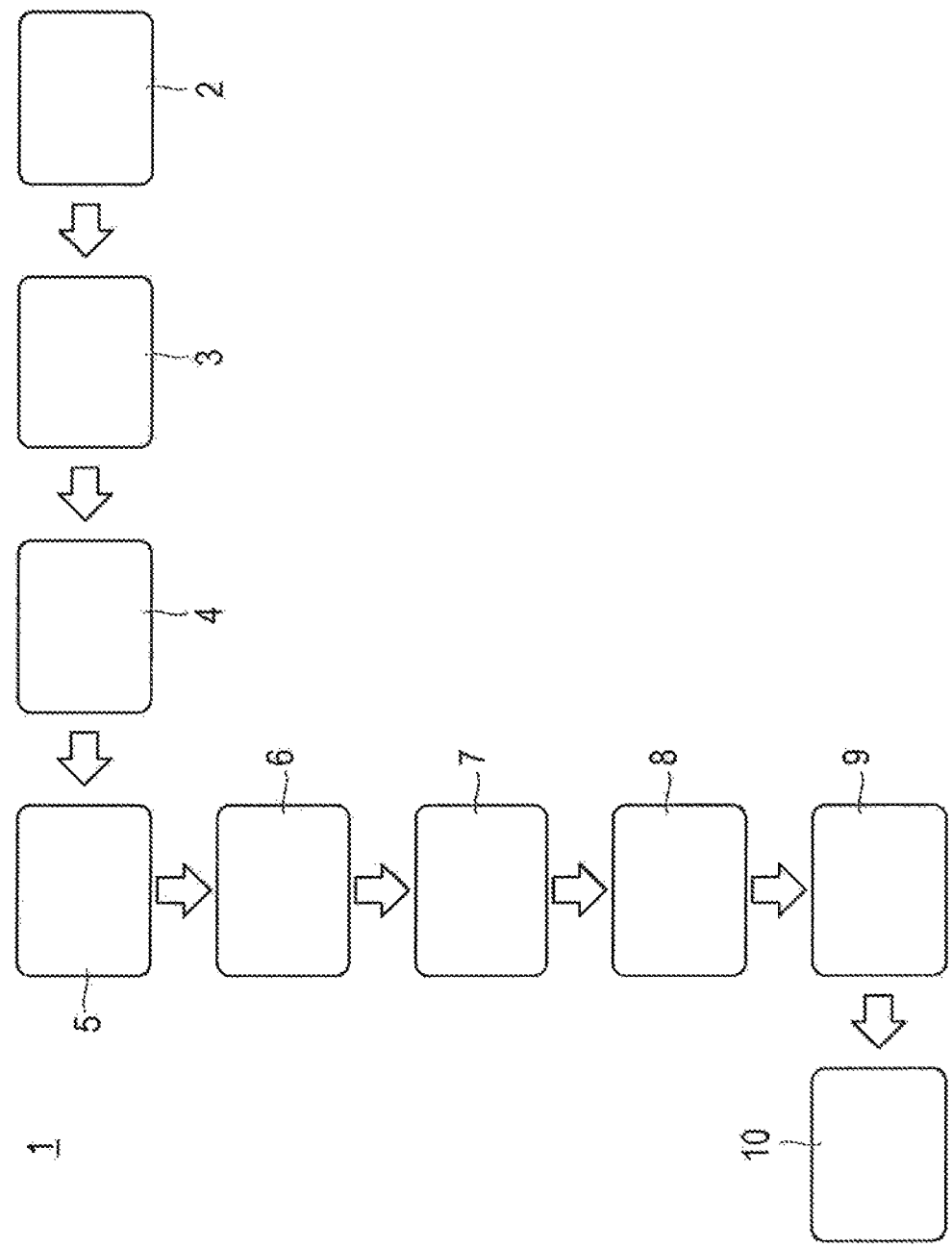
FIG. 1 is a schematic view illustrating a noodle cooking apparatus according to the present embodiment.

An embodiment of the present invention will be described with reference to FIGS. 1 to 6. Note that, in the description of the drawings, the same elements are denoted by the same reference numerals, and redundant description is omitted. There might be a case where the dimensional ratios in the drawings are exaggerated for convenience of explanation, and differ from actual ratios. The present embodiment will describe an exemplary case of noodles used for fried noodles, as an example of food.

Figure 2:
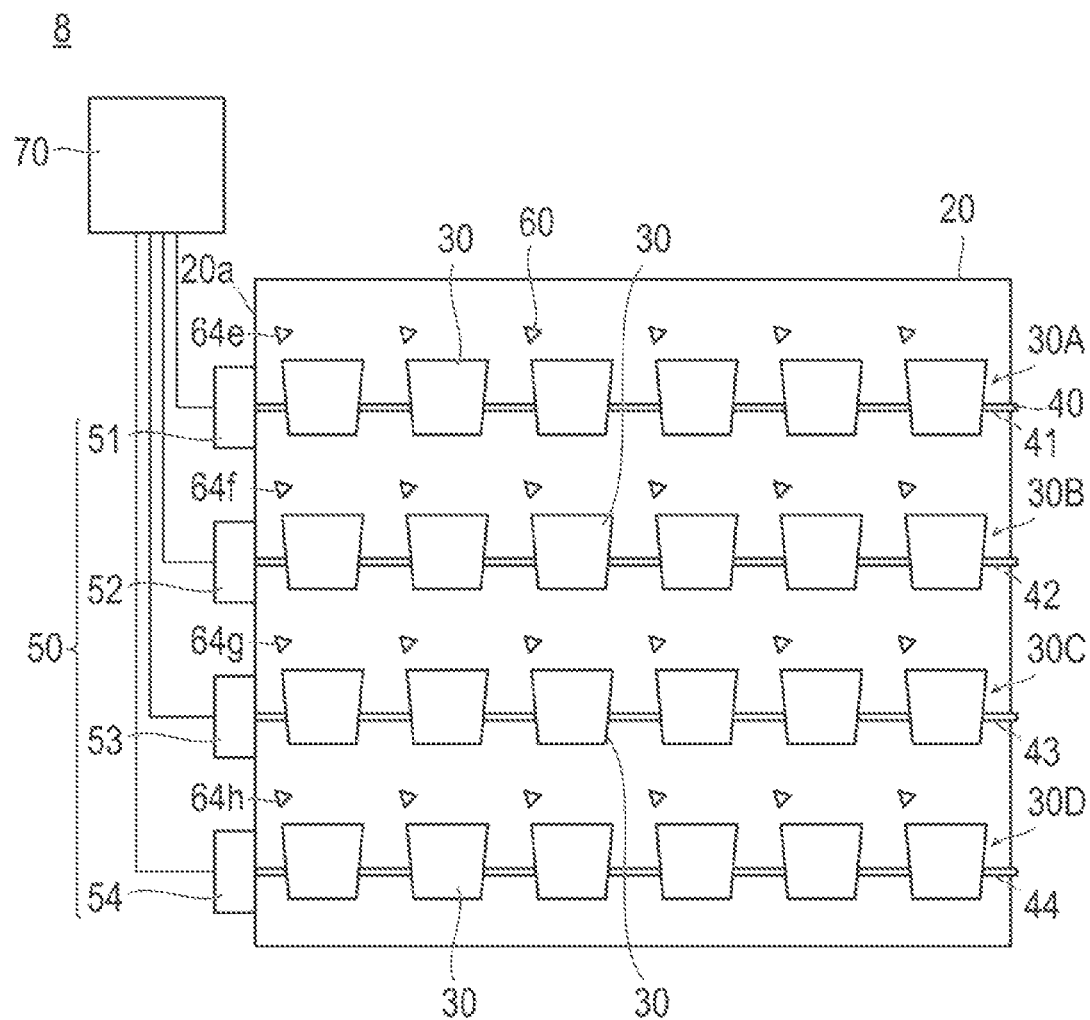
FIG. 2 is a schematic view illustrating a mixing apparatus of the noodle cooking apparatus according to the present embodiment.
Figure 3:
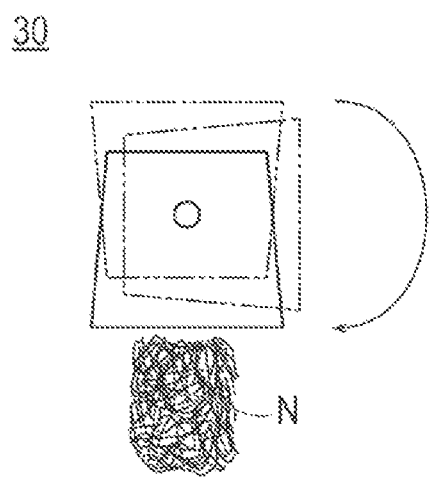
FIG. 3 is a schematic view illustrating a state where a hopper rotates and noodles fall viewed from the left side of FIG. 2.
Figure 4:
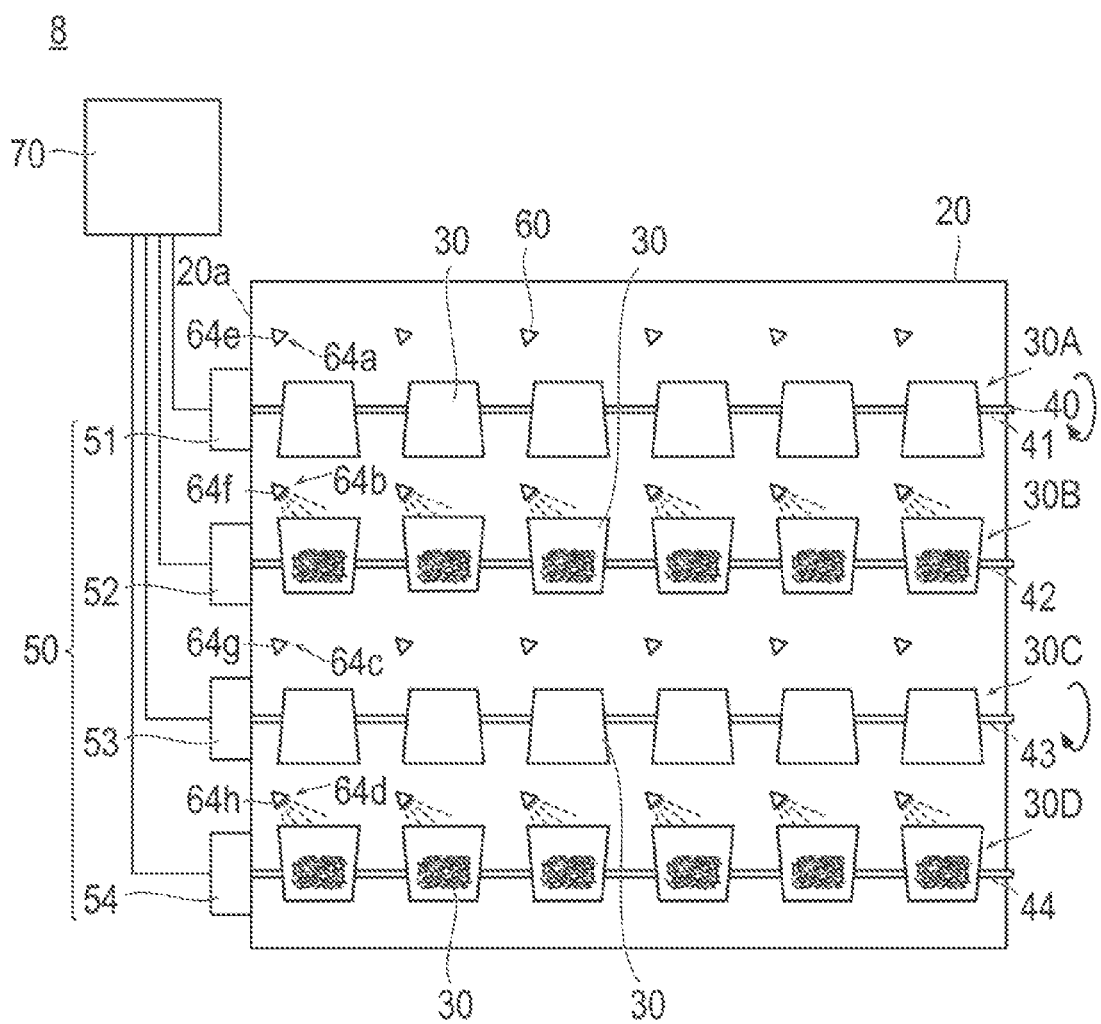
FIG. 4 is a schematic view illustrating a state where hopper groups in first and third lines of the mixing apparatus rotate and noodles have been input to hopper groups in second and fourth lines.
Figure 5:
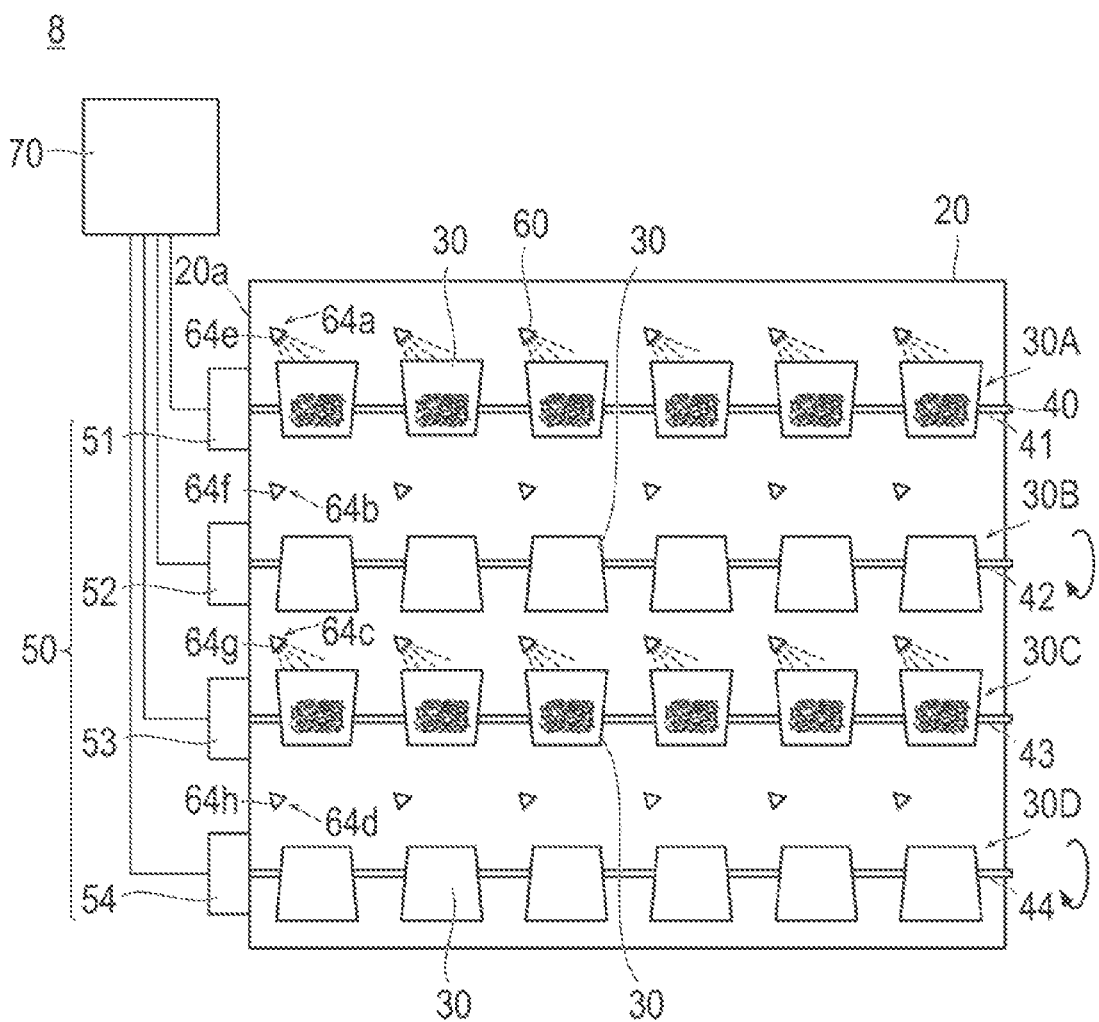
FIG. 5 is a schematic view illustrating a state where hopper groups in second and fourth lines of the mixing apparatus rotate and noodles have been input to hopper groups in first and third lines.
Figure 6:
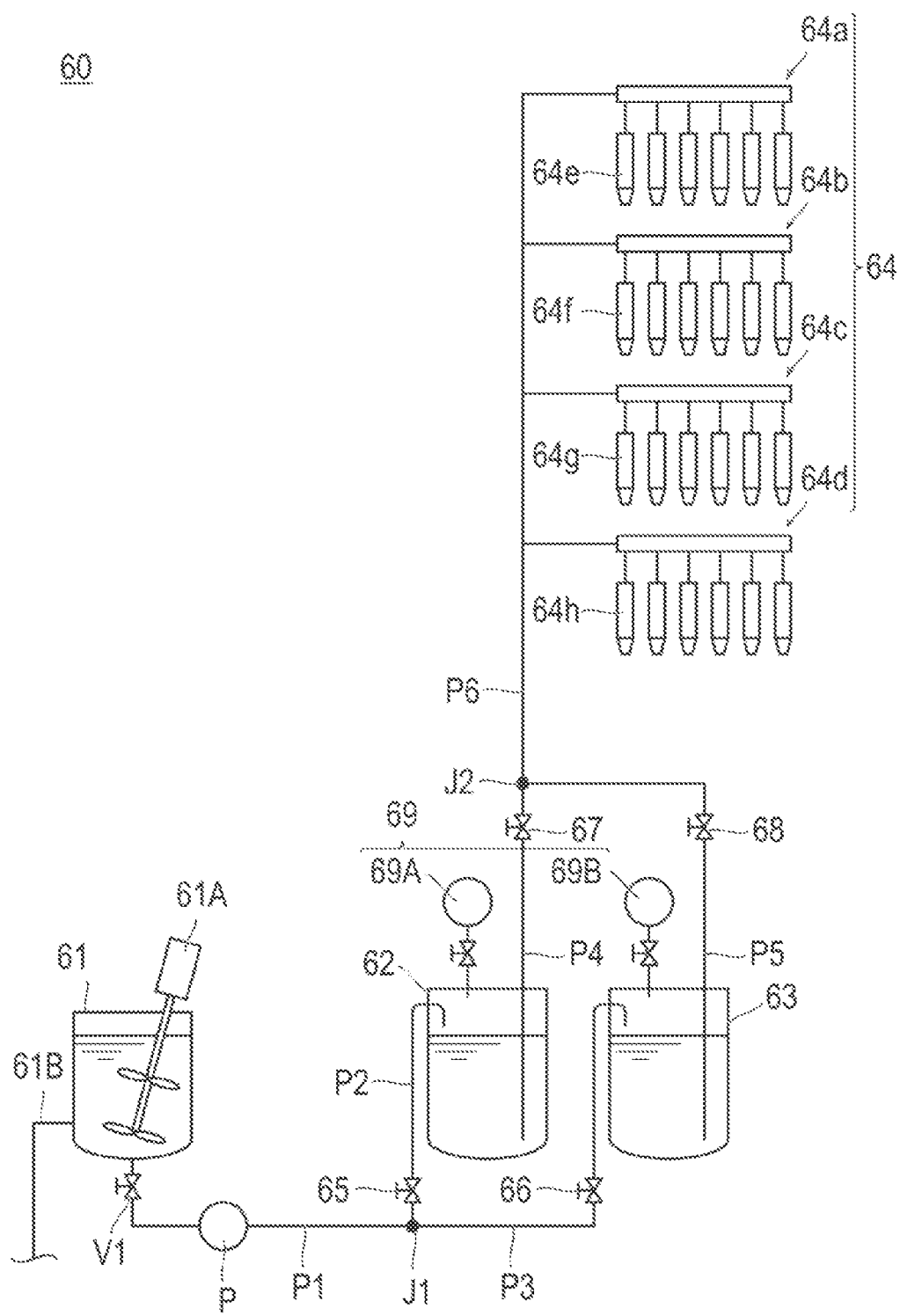
FIG. 6 is a schematic view illustrating a supply device.

FIG. 1 is a schematic view illustrating a noodle cooking apparatus 1 according to the present embodiment. FIG. 2 is a schematic view illustrating a mixing apparatus 8 of the noodle cooking apparatus 1 according to the present embodiment. FIG. 3 is a schematic view illustrating a state where a hopper 30 rotates and noodles fall, viewed from the left side of FIG. 2. FIG. 4 is a schematic view illustrating a state where hopper groups 30A and 30C in first and third lines of the mixing apparatus 8 rotate and noodles have been input to hopper groups 30B and 30D in second and fourth lines. FIG. 5 is a schematic view illustrating a state where hopper groups 30B and 30D in second and fourth lines of the mixing apparatus 8 rotate and noodles have been input to hopper groups 30A and 30C in first and third lines. FIG. 6 is a schematic view illustrating a supply device 60. First, a schematic configuration of the noodle cooking apparatus 1 will be described with reference to FIG. 1.

As illustrated in FIG. 1, the noodle cooking apparatus 1 includes: a mixer 2 that mixes water and flour; a rolling device 3 that rolls a mixture of water and flour to form a noodle strip; an aging device 4 that ages the noodle strip at a predetermined temperature and humidity; a cutting device 5 that cuts the noodle strip into a desired weight; a boiling device 6 that boils the noodles cut by the cutting device 5; a cooling tank 7 that tightens the boiled noodles with cold water; a mixing apparatus 8 that mixes a sauce (additive) with the noodles; a receiving tray 9 that receives the noodles mixed with the sauce; and a freezer 10 that freezes the noodles input to the receiving tray 9.

In the present embodiment, a plurality of noodles cut by the cutting device 5 is gathered into a bundle (hereinafter sometimes referred to as a noodle bundle) and bundles are divided such that six sets are distributed in the left-right direction of FIG. 1 (width direction orthogonal to the falling direction). The six sets of noodle bundles each cut into a desired amount by the cutting device 5 goes, in the divided states, through the boiling device 6, the cooling tank 7, and the mixing apparatus 8, so as to be input to the receiving tray 9. Hereinafter, a configuration of the mixing apparatus 8 will be described in detail with reference to FIGS. 2 to 6.

As illustrated in FIG. 2, the mixing apparatus 8 includes: a box 20, a hopper 30 provided inside the box 20; a shaft 40 that pivotally supports the hopper 30; an actuator 50 that rotates the shaft 40; a supply device 60 that supplies a sauce to the noodles in the hopper 30, and a controller 70 that controls the driving of the actuator 50 and the supply device 60.

As illustrated in FIG. 2, the box 20 internally includes the hopper 30 and sprayers 64e, 64f, 64g, and 64h of the supply device 60. The actuator 50 is mounted on a left wall 20a of the box 20.

The hopper 30 is open at the top in an initial state and houses noodles falling from above. As illustrated in FIG. 3, the hopper 30 is provided to be rotatable about an axis of a shaft 40 described below. Noodles N fall downward by the rotation of the hopper 30.

As illustrated in FIG. 2, six hoppers 30 are provided in the width direction (left-right direction in FIG. 2), and hoppers are provided in four lines in the falling direction (up-down direction in FIG. 2). That is, in the present embodiment, 24 hoppers 30 are provided. Hereinafter, the six hoppers 30 provided in the first line from the top are denoted as the first hopper group 30A, and the six hoppers 30 provided in the second line from the top are denoted as the second hopper group 30B, the six hoppers 30 provided in the third line from the top are denoted as the third hopper group 30C, and the six hoppers 30 provided in the fourth line from the top are denoted as the fourth hopper group 30D.

As illustrated in FIG. 2, the shaft 40 includes, in order from the top, a first shaft 41, a second shaft 42, a third shaft 43, and a fourth shaft 44. As illustrated in FIG. 2, each of the first shaft 41 to the fourth shaft 44 is provided to extend in the width direction (left-right direction in FIG. 2).

The first shaft 41 pivotally supports the first hopper group 30A. The second shaft 42 pivotally supports the second hopper group 30B. The third shaft 43 pivotally supports the third hopper group 30C. The fourth shaft 44 pivotally supports the fourth hopper group 30D.

As illustrated in FIG. 2, the actuator 50 includes, in order from the top, a first actuator 51, a second actuator 52, a third actuator 53, and a fourth actuator 54.

The first actuator 51 is connected to the first shaft 41 and rotates the first shaft 41 about the axis. The second actuator 52 is connected to the second shaft 42 and rotates the second shaft 42 about the axis. The third actuator 53 is connected to the third shaft 43, and rotates the third shaft 43 around the axis. The fourth actuator 54 is connected to the fourth shaft 44, and rotates the fourth shaft 44 about the axis.

The angle at which the actuator 50 rotates the shaft 40 is not particularly limited, but the angle is to be in the range of 160° to 180°. In the present embodiment, as illustrated in FIG. 3, the direction in which the actuator 50 rotates the shaft 40 is clockwise as viewed from the left side of FIG. 2. It should be noted that the invention is not limited to the above and the direction in which the actuator 50 rotates the shaft 40 may be counterclockwise as viewed from the left side of FIG. 2.

As illustrated in FIG. 4, the first actuator 51 and the third actuator 53 are controlled by the controller 70 so as to rotate the first shaft 41 and the third shaft 43 at the same timing. Furthermore, as illustrated in FIG. 5, the second actuator 52 and the fourth actuator 54 are controlled by the controller 70 so as to rotate the second shaft 42 and the fourth shaft 44 at the same timing.

As illustrated in FIG. 6, the supply device 60 includes a main tank 61, a first tank 62, a second tank 63, a spray device 64, a first switching valve 65, a second switching valve 66, a third switching valve 67, a fourth switching valve 68, and a pressurizing unit 69.

The main tank 61 stores a sauce. The sauce in the main tank 61 is preferably stirred by a stirring bar 61A. The main tank 61 is connected with a drain pipe 61B. Unnecessary sauce is discarded to the outside through the drain pipe 61B.

The first tank 62 and the second tank 63 are connected to the main tank 61. Between the main tank 61 and the first tank 62, a first pipe P1 and a second pipe P2 are arranged. Between the main tank 61 and the second tank 63, the first pipe P1 and a third pipe P3 are arranged. The first pipe P1 is branched into the second pipe P2 and the third pipe P3 at a branch part J1.

The first pipe P1 includes a switching valve V1 that switches on/off of the outflow of the sauce from the main tank 61. In addition, a pump P that delivers a sauce from the main tank 61 to the first tank 62 or the second tank 63 is disposed in the first pipe P1.

The first switching valve 65 is disposed on the second pipe P2. The first switching valve 65 switches on/off of the supply of the sauce stored in the main tank 61 to the first tank 62.

The second switching valve 66 is disposed on the third pipe P3. The second switching valve 66 switches on/off of the supply of the sauce stored in the main tank 61 to the second tank 63.

As illustrated in FIG. 6, the spray device 64 includes a first spray device 64a, a second spray device 64b, a third spray device 64c, and a fourth spray device 64d. The spray device 64 preferably supplies the sauce to the noodles while the noodles are falling toward the hopper 30.

The first spray device 64a sprays the sauce on the noodles housed in the first hopper group 30A (refer to FIG. 2). As illustrated in FIG. 6, the first spray device 64a includes six sprayers 64e.

The second spray device 64b sprays the sauce on the noodles housed in the second hopper group 30B (refer to FIG. 2). The second spray device 64b includes six sprayers 64f as illustrated in FIG. 6.

The third spray device 64c sprays the sauce onto the noodles housed in the third hopper group 30C (refer to FIG. 2). As illustrated in FIG. 6, the third spray device 64c includes six sprayers 64g.

The fourth spray device 64d sprays the sauce onto the noodles housed in the fourth hopper group 30D (refer to FIG. 2). As illustrated in FIG. 6, the fourth spray device 64d includes six sprayers 64h.

The spray device 64 is connected to the first tank 62 and the second tank 63 as illustrated in FIG. 6. Between the spray device 64 and the first tank 62, a fourth pipe P4 and a sixth pipe P6 are arranged. Between the spray device 64 and the second tank 63, a fifth pipe P5 and the sixth pipe P6 are arranged. The fourth pipe P4 and the fifth pipe P5 join the sixth pipe P6 at a junction J2.

The sixth pipe P6 branches into four so as to be connected to each of the first spray device 64a, the second spray device 64b, the third spray device 64c, and the fourth spray device 64d.

The third switching valve 67 is disposed on the fourth pipe P4. The third switching valve 67 switches on/off of the supply of the sauce stored in the first tank 62 to the spray device 64.

The fourth switching valve 68 is disposed on the fifth pipe P5. The fourth switching valve 68 switches on/off of the supply of the sauce stored in the second tank 63 to the spray device 64.

The pressurizing unit 69 includes a first pressurizing unit 69A that applies pressure to the first tank 62, and a second pressurizing unit 69B that applies pressure to the second tank 63.

The first pressurizing unit 69A increases the pressure inside the first tank 62 and transfers the sauce in the first tank 62 to the spray device 64. The first pressurizing unit 69A is a pump, for example.

The second pressurizing unit 69B raises the pressure inside the second tank 63 and pumps the sauce in the second tank 63 to the spray device 64. The second pressurizing unit 69B is a pump, for example.

Hereinafter, a method for using the supply device 60 will be described.

First, the main tank 61, the first tank 62, and the second tank 63 are filled with a sauce.

Next, the pressure inside the first tank 62 is increased by the first pressurizing unit 69A, and the sauce in the first tank 62 is pumped to the spray device 64. At this time, the first switching valve 65, the second switching valve 66, and the fourth switching valve 68 are to be closed so as to prevent the movement of the sauce. In contrast, the third switching valve 67 is left open so that the sauce moves.

When the sauce in the first tank 62 is depleted, the pressure in the second tank 63 is increased by the second pressurizing unit 69B, and the sauce in the second tank 63 is pumped to the spray device 64. At this time, the second switching valve 66 and the third switching valve 67 are to be closed so as to prevent the movement of the sauce. In contrast, the fourth switching valve 68 is left open so that the sauce moves.

Furthermore, the pressurization of the first pressurizing unit 69A is stopped to set the inside of the first tank 62 to the atmospheric pressure. Subsequently, the sauce is supplied from the main tank 61 into the first tank 62 by the pump P. At this time, the switching valve V1 and the first switching valve 65 are left open. With this configuration, the sauce can be filled into the first tank 62 while the sauce is supplied from the second tank 63 to the spray device 64.

Moreover, when the sauce in the second tank 63 is depleted, the pressure in the first tank 62 is increased by the first pressurizing unit 69A, and the sauce in the first tank 62 is pumped to the spray device 64. At this time, the first switching valve 65 and the fourth switching valve 68 are to be closed so as to prevent the movement of the sauce. In contrast, the third switching valve 67 is left open so that the sauce moves.

Furthermore, the pressurization of the second pressurizing unit 69B is stopped to set the inside of the second tank 63 to the atmospheric pressure. Subsequently, the sauce is supplied from the main tank 61 into the second tank 63 by the pump P. At this time, the switching valve V1 and the second switching valve 66 are left open. With this configuration, the sauce can be filled into the second tank 63 while the sauce is supplied from the first tank 62 to the spray device 64.

According to the supply device 60 configured as described above, it is possible to supply the sauce to the spray device 64 without interruption, and thus, productivity will be improved.

The controller 70 controls driving of the actuator 50 and the supply device 60. The controller 70 is a CPU, for example. The controller 70 applies air pressure to the sauce supplied to the spray device 64 at a desired timing so as to spray the sauce into the hopper 30.

Next, a method for using the noodle cooking apparatus 1 according to the present embodiment will be described.

First, water and flour are mixed by the mixer 2. Subsequently, the rolling device 3 rolls the mixture of water and flour to form a noodle strip. Subsequently, the aging device 4 ages the noodle strip. Subsequently, the noodle strip is cut by the cutting device 5 so as to have a desired weight. At this time, the noodle strips, in the form of noodle bundles, are divided into six sets in the left-right direction in FIG. 1.

Next, the six sets of noodle bundles are individually boiled by the boiling device 6. The six sets of noodle bundles are individually cooled by the cooling tank 7 and tightened. The six sets of noodle bundles are individually coated with the sauce by the mixing apparatus 8. Subsequently, the six sets of noodle bundles coated with the sauce fall individually on the receiving tray 9 and are frozen by the freezer 10.

Next, movement of the noodles in the mixing apparatus 8 will be described in detail.

As illustrated in FIG. 1, the noodles tightened with cold water in the cooling tank 7 fall from the cooling tank 7 and then fall into the first hopper group 30A (state of FIG. 5). At this time, the first spray device 64a sprays the sauce on the noodles while the noodles are falling toward the first hopper group 30A. At this time, the sauce is sprayed on each of the six sets of noodle bundles. The noodles sprayed with the sauce are housed in the first hopper group 30A.

Subsequently, as the first hopper group 30A rotates around the axial direction of the first shaft 41 as illustrated in FIG. 3, the noodle bundle housed in the first hopper group 30A is substantially inverted upside down, and then, falls into the second hopper group 30B (state illustrated in FIG. 4). At this time, the second spray device 64b sprays the sauce on the noodles while the noodles are falling toward the second hopper group 30B. Since the sauce is sprayed on the noodles after the noodles are substantially inverted upside down in this manner, the sauce is sprayed on the side of the noodle bundle that is relatively not in touch with the sauce. Therefore, the noodles can be suitably coated with the sauce. The noodles sprayed with the sauce are housed in the second hopper group 30B.

Subsequently, as the second hopper group 30B rotates around the axial direction of the second shaft 42 as illustrated in FIG. 3, the noodle bundle housed in the second hopper group 30B is substantially inverted upside down, and then, falls into the third hopper group 30C (state illustrated in FIG. 5). At this time, the third spray device 64c sprays the sauce on the noodles while the noodles are falling toward the third hopper group 30C. The noodles sprayed with the sauce are housed in the third hopper group 30C.

Subsequently, as the third hopper group 30C rotates around the axial direction of the third shaft 43 as illustrated in FIG. 3, the noodle bundle housed in the third hopper group 30C is substantially inverted upside down, and then, falls into the fourth hopper group 30D (state illustrated in FIG. 4). At this time, the fourth spray device 64d sprays the sauce on the noodles while the noodles are falling toward the fourth hopper group 30D. The noodles sprayed with the sauce are housed in the fourth hopper group 30D.

As described above, according to the mixing apparatus 8 of the present embodiment, the noodles cut to have a desired weight by the cutting device 5 are coated with the sauce in the hopper 30. After the noodles are coated with the sauce, the noodles fall into the receiving tray 9, and thus, a desired amount of noodles is input, as it is, to the receiving tray 9. In comparison, for example, with a manufacturing method in which the noodles are collectively input to a cooking pot, an additive is added, the noodles are coated with the additive, and thereafter the noodles are manually input to the receiving tray so that the desired amount is obtained, there would be a need to perform weighing in order to confirm whether the noodles with the desired weight are input, deteriorating the productivity. In comparison, with the mixing apparatus 8 according to the present embodiment, the preliminarily weighed desired amount of noodles are coated with the sauce in the hopper 30, and after being coated with the sauce, the noodles fall into the receiving tray 9. Accordingly, this makes it possible to dispose the desired amount of noodles on the receiving tray 9 as it is. For this reason, there is no need to weigh after the noodles have been input to the receiving tray 9, leading to improved productivity.

As described above, the mixing apparatus 8 according to the present embodiment is a mixing apparatus 8 that mixes the sauce with the noodles while the noodles are falling onto the receiving tray 9. The mixing apparatus 8 includes: the hopper 30 that houses the falling noodles and that allows noodles to fall while rotating; and the supply device 60 that supplies the sauce to the noodles in the hopper 30. The hoppers 30 are provided in four lines along the noodle falling direction. According to the mixing apparatus 8 configured in this manner, the sauce is automatically supplied to the noodles in the hopper 30, and then, the noodles fall by the rotation of the hopper 30. Therefore, it is possible to efficiently input the noodles coated with the sauce into the receiving tray 9. Furthermore, the preliminarily weighed desired amount of noodles are coated with the sauce in the hopper 30, and after being coated with the sauce, the noodles fall into the receiving tray 9, making it possible to arrange the desired amount of noodles on the receiving tray 9 as it is. For this reason, there is no need to weigh after the noodles are input into the receiving tray 9. As described above, it is possible to provide a mixing apparatus 8 capable of efficiently inputting the noodles coated with the sauce to the receiving tray 9, without the need to weigh after the noodles are input to the receiving tray 9.

Moreover, six hoppers 30 are provided in the width direction (left-right direction in FIG. 2) orthogonal to the falling direction. The six hoppers 30 disposed in the width direction are rotatable on the shaft 40 extending in the width direction. According to the mixing apparatus 8 configured in this manner, it is possible to simultaneously coat six sets of noodle bundles with the sauce, leading to improvement of productivity. Furthermore, it is possible to allow the noodles to fall downward with a simple configuration as compared to a rack-and-pinion type configuration of a first modification described below. Furthermore, the maintenance of the apparatus can be simplified as compared with the rack and pinion type configuration.

Moreover, the supply device 60 supplies the sauce to the noodles while the noodles are falling toward the hopper 30. With the mixing apparatus 8 configured in this manner, it is possible to increase the area of the noodles, in which the sauce is sprayed. This makes it possible to more suitably coat the noodles with the sauce.

Moreover, the supply device 60 includes the main tank 61 in which the sauce is stored; the first tank 62 connected to the main tank 61; the second tank 63 connected to the main tank 61; the spray device 64 to which the sauce is supplied from the first tank 62 or the second tank 63 and that sprays the sauce onto the noodles; the first switching valve 65 that switches on/off of the supply of the sauce stored in the main tank 61 to the first tank 62; the second switching valve 66 that switches on/off of the supply of the sauce stored in the main tank 61 to the second tank 63; the third switching valve 67 that switches on/off of the supply of the sauce stored in the first tank 62 to the spray device 64; the fourth switching valve 68 that switches on/off of the supply of the sauce stored in the second tank 63 to the spray device 64; and the pressurizing unit 69 that applies pressure to the first tank 62 or the second tank 63 and that pumps the sauce from the first tank 62 or the second tank 63 to the spray device 64. According to the mixing apparatus 8 configured in this manner, for example, when the sauce of the first tank 62 is depleted, it is possible, by switching to the second tank 63, to pump the sauce from the second tank 63 to the spray device 64. Conversely, when the sauce of the second tank 63 is depleted, it is possible, by switching to the first tank 62, to pump the sauce from the first tank 62 to the spray device 64. Accordingly, since the sauce can be supplied to the spray device 64 without interruption, productivity is improved.

<First Modification>

Figure 7:
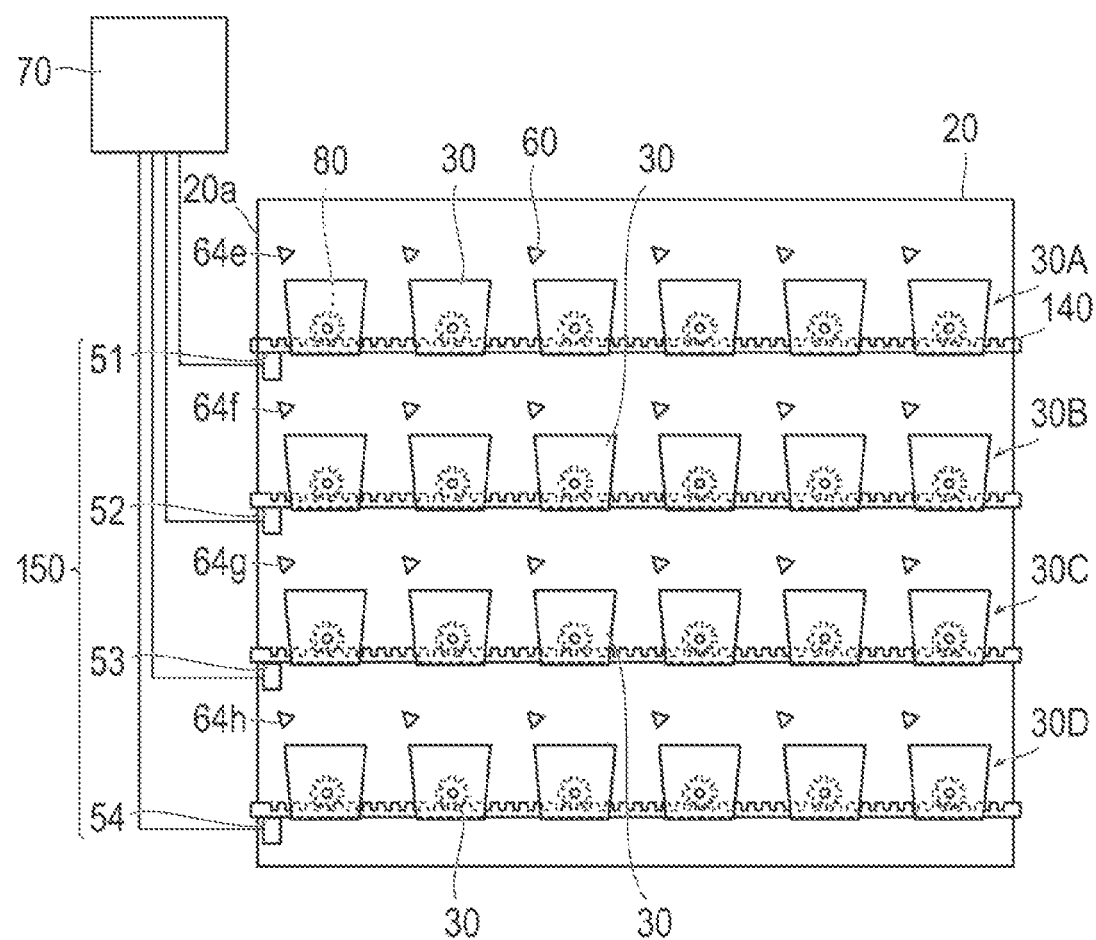
FIG. 7 is a schematic view illustrating a mixing apparatus according to a first modification.

Next, with reference to FIG. 7, a configuration of a mixing apparatus 108 according to a first modification will be described. FIG. 7 is a schematic view illustrating the mixing apparatus 108 according to the first modification.

As illustrated in FIG. 7, the mixing apparatus 108 according to the first modification includes: the box 20; the hopper 30; a pinion 80 that pivotally supports the hopper 30; a rack 140 that rotates the pinion 80; an actuator 50 that moves the rack 140 in the left-right direction of FIG. 7; the supply device 60; and the controller 70. Since the configuration of the box 20, the hopper 30, the supply device 60, and the controller 70 is the same as in the above-described embodiment, the description thereof will be omitted.

In the mixing apparatus 108 according to the first modification, the pinion 80 is rotated by moving the rack 140 in the left-right direction in FIG. 7 by the actuator 150. The hopper 30 rotates clockwise in FIG. 7 together with the clockwise rotation of the pinion 80, thereby allowing the noodles in the hopper 30 to fall downward.

According to the mixing apparatus 108 configured in this manner, it is possible to allow the noodles to fall downward while coating the noodles with the sauce. Furthermore, with the mixing apparatus 108 according to the first modification, it is possible to simultaneously coat six sets of noodle bundles with the sauce, leading to improvement of productivity.

The present invention is not limited to the above-described embodiments, and various modifications and alterations can be made within the scope of the claims.

For example, in the above-described embodiment, six hoppers 30 are provided in the width direction and four lines are provided in the falling direction. However, the number of hoppers 30 provided in the width direction is not limited, and it is sufficient as long as at least two lines are provided in the falling direction.

In the above-described embodiment, the supply device 60 supplies the sauce to the noodles while the noodles are falling toward the hopper 30. However, it is allowable to spray the sauce to the noodles after the noodles land on the hopper 30.

Moreover, the above embodiment has described a process of supplying a liquid sauce to the noodles to manufacture the fried noodles. However, the powdered sauce may be supplied to the noodles to manufacture the fried noodles. Furthermore, the object to be manufactured is not limited to fried noodles. The technology can also be applied to, for example, spaghetti, "Udon (thick noodles)", and cold wheat noodles such as "Hiyamugi" and "Somen".

Moreover, the above embodiment has described an exemplary case of noodles used for fried noodles, as an example of food. However, the food is not particularly limited as long as the additive is mixed in the food. For example, the food may be seaweed, cut vegetables, "Tokoroten (seaweed jelly)", rice, or "Natto".

The above embodiment has described an exemplary case of using sauce, as an example of the additive. However, the additive is not particularly limited as long as it is mixed with food. For example, the additive may include: vegetable oils such as rapeseed oil, corn oil, cottonseed oil, sunflower oil, olive oil, safflower oil, soybean oil, palm oil; animal/vegetable oils such as fish oil, egg yolk oil, or refined oils from these; various seasonings such as soy sauce, sugar, salt, vinegar, citrus juice, ketchup; milk such as cow milk, skim milk powder, whole milk powder, whey protein; and eggs such as egg yolk, egg white, whole eggs; spices, fragrances, pigments, those containing or a mixture of these.

REFERENCE SIGNS LIST

1 Noodle cooking apparatus
8, 108 Mixing apparatus
9 Receiving tray
30 Hopper
40 Shaft
60 Supply device
61 Main tank
62 First tank
63 Second tank
64 Spray device
65 First switching valve
66 Second switching valve
67 Third switching valve
68 Fourth switching valve
69 Pressurizing unit

What is claimed is:

1. A mixing apparatus that mixes an additive with a food, the mixing apparatus comprising:
a plurality of hoppers, each hopper of the plurality of hoppers has a top, the top of each hopper of the plurality of hoppers being separate from another hopper, and each of the plurality of hoppers in an initial state being open at the top and capable of housing the food received from above;
a first hopper of the plurality of hoppers being pivotably supported by a first shaft that has an axis; the first hopper receiving the food in the initial state; when the first hopper rotates, the food previously received inside the first hopper falls from the top of the first hopper to directly outside the first hopper in a falling direction by a rotation of the first hopper about the axis of the first shaft;
a second hopper of the plurality of hoppers being pivotably supported by a second shaft that has an axis; the second hopper including a top that receives the food that has fallen out of the first hopper so that the food is located inside the second hopper, when the second hopper rotates after receiving the food that has fallen out of the first hopper, the food inside the second hopper falls from the top of the second hopper directly outside the second hopper in the falling direction by rotation of the second hopper about the axis of the second shaft;
a supply device that supplies the additive to the food; and
wherein the first hopper is one of a plurality of first hoppers, the plurality of first hoppers being spaced apart in a width direction orthogonal to the falling direction, and each of the plurality of first hoppers provided in the width direction being rotatable, the second hopper being positioned directly below one of the plurality of first hoppers in the falling direction.

2. The mixing apparatus according to claim 1, wherein
each of the plurality of first hoppers provided in the width direction is rotatably attached to the first shaft extending in the width direction.

3. The mixing apparatus according to claim 1, wherein the supply device supplies the additive to the food while the food is falling in the falling direction.

4. The mixing apparatus according to claim 1, wherein the supply device includes:
a main tank in which an additive is stored;
a first tank connected to the main tank;
a second tank connected to the main tank;
a spray device to which the additive is supplied from the first tank or the second tank and that sprays the additive onto the food;
a first switching valve that switches on/off of the supply of the additive stored in the main tank to the first tank;
a second switching valve that switches on/off of the supply of the additive stored in the main tank to the second tank;
a third switching valve that switches on/off of the supply of the additive stored in the first tank to the spray device;
a fourth switching valve that switches on/off of the supply of the additive stored in the second tank to the spray device; and
a pressurizing unit that applies pressure to the first tank or the second tank and that pumps the additive from the first tank or the second tank to the spray device.

5. The mixing apparatus according to claim 1, wherein all of the plurality of first hoppers are positioned vertically above the second hopper.

6. The mixing apparatus according to claim 5, wherein the plurality of first hoppers includes at least three first hoppers.

7. The mixing apparatus according to claim 5, wherein the second hopper is one of a plurality of second hoppers that each receive the food that has fallen out of a respective one of the plurality of first hoppers, each of the plurality of second hoppers being rotatable to allow the food to fall out of the plurality of second hoppers in the falling direction, the plurality of second hoppers being spaced apart from one another in a width direction, all of the plurality of second hoppers being positioned vertically below all of the plurality of first hoppers in the falling direction.

8. The mixing apparatus according to claim 7, wherein the plurality of second hoppers includes at least three second hoppers.

9. The mixing apparatus according to claim 7, wherein all of the plurality of first hoppers rotate about the axis of the first shaft, and all of the plurality of second hoppers rotate about the axis of the second shaft, the first axis and the second axis being spaced apart from one another.

10. The mixing apparatus according to claim 1, wherein the supply device includes a spray device positioned to spray the additive on the falling food that is falling in the falling direction toward the second hopper.

11. The mixing apparatus according to claim 1, wherein the supply device includes a spray device positioned to spray the additive on the food after the food has fallen into the second hopper.

12. A mixing apparatus that mixes an additive with a food, the mixing apparatus comprising:
- a plurality of hoppers; each hopper of the plurality of hoppers having an open top, the open top of each hopper of the plurality of hoppers being separate from each open top of another hopper, and each of the plurality of hoppers in an initial state being capable of housing the food received from above through the open top;
- a first hopper of the plurality of hoppers being positioned vertically above a second hopper of the plurality of hoppers and receiving the food that is falling in a falling direction, the first hopper being rotatable about a first axis of rotation to allow the food in the first hopper to fall directly outside an open top of the first hopper in the falling direction toward the second hopper after rotation of the first hopper about the first axis of rotation;
- the second hopper being positioned vertically below the first hopper to receive the food that has fallen out of the first hopper and being positioned vertically above a receiving tray, the second hopper being rotatable about a second axis of rotation different from the first axis of rotation to allow the food in the second hopper to fall directly outside an open top of the second hopper in the falling direction toward the receiving tray after rotation of the second hopper about the second axis of rotation;
- a supply device that supplies the additive to the food that has fallen out of the first hopper so that the additive is added to the food as the food is falling toward the second hopper and/or when the food is in the second hopper; and
- wherein the first hopper is one of a plurality of first hoppers, the plurality of first hoppers being spaced apart in a width direction orthogonal to the falling direction, and each of the plurality of first hoppers provided in the width direction is rotatable, the second hopper being positioned directly below one of the first hoppers in the falling direction.

13. The mixing apparatus according to claim 12, wherein all of the plurality of first hoppers are positioned vertically above the second hopper.

14. The mixing apparatus according to claim 13, wherein the second hopper is one of a plurality of second hoppers that each receive the food that has fallen out of a respective one of the plurality of first hoppers, each of the plurality of second hoppers being rotatable to allow the food to fall out of the plurality of second hoppers and to fall toward the receiving tray, the plurality of second hoppers being spaced apart from one another in a width direction, all of the plurality of second hoppers being positioned vertically below all of the plurality of first hoppers in the falling direction.

15. The mixing apparatus according to claim 14, wherein all of the plurality of first hoppers rotate about the first axis of rotation, and all of the plurality of second hoppers rotate about the second axis of rotation, the first axis of rotation being spaced vertically above the second axis of rotation in the falling direction.

16. The mixing apparatus according to claim 14, wherein each of the plurality of first hoppers rotates about a respective and different axis of rotation, and each of the plurality of second hoppers rotates about a respective and different axis of rotation, the axis of rotation of each of the plurality of first hoppers being positioned vertically above the axis of rotation of each of the plurality of second hoppers.

17. The mixing apparatus according to claim 12, wherein the supply device includes one spray device that sprays the additive on the food as the food is falling toward the second hopper and/or when the food is in the second hopper, the supply device also including another spray device that is separate from the one spray device and that sprays the additive on the food as the food is falling toward the plurality of first hoppers and/or when the food is in the plurality of first hoppers.

18. A mixing apparatus that mixes an additive with a food, the mixing apparatus comprising:
- a plurality of hoppers, each hopper of the plurality of hoppers has a top, the top of each hopper of the plurality of hoppers being separate from another hopper, and each of the plurality of hoppers in an initial state being open at the top and capable of housing the food received from above;
- a first hopper of the plurality of hoppers being pivotably supported to rotate about a first axis; the first hopper receiving the food in the initial state; when the first hopper rotates, the food previously received inside the first hopper falls from the top of the first hopper to directly outside the first hopper in a falling direction by a rotation of the first hopper about the axis of the first shaft;
- a second hopper of the plurality of hoppers being pivotably supported to rotate about a second axis; the second hopper including a top that receives the food that has fallen out of the first hopper so that the food is located inside the second hopper, when the second hopper rotates after receiving the food that has fallen out of the first hopper, the food inside the second hopper falls from the top of the second hopper directly outside the second hopper in the falling direction by rotation of the second hopper about the second axis;
- a supply device that supplies the additive to the food; and
  wherein the first hopper is one of a plurality of first hoppers, the plurality of first hoppers being spaced apart in a width direction orthogonal to the falling direction, and each of the plurality of first hoppers provided in the width direction being rotatable, the second hopper being positioned directly below one of the plurality of first hoppers in the falling direction.

19. The mixing apparatus according to claim 18, wherein the apparatus further comprises: a plurality of pinions, each of the pinions pivotally supporting one of the first hoppers; and a rack that rotates the pinions.

20. The mixing apparatus according to claim 18, wherein the second hopper is one of a plurality of second hoppers that each receive the food that has fallen out of a respective one of the plurality of first hoppers, each of the plurality of second hoppers being rotatable to allow the food to fall out of the plurality of second hoppers in the falling direction, the plurality of second hoppers being spaced apart from one another in a width direction, all of the plurality of second hoppers being positioned vertically below all of the plurality of first hoppers in the falling direction.

21. The mixing apparatus according to claim 20, wherein each of the plurality of first hoppers rotates about a respective and different axis of rotation, and each of the plurality of second hoppers rotates about a respective and different axis of rotation.

* * * * *